United States Patent [19]

Masek

[11] Patent Number: 4,468,791
[45] Date of Patent: Aug. 28, 1984

[54] METHOD AND FACILITY FOR DECODING A BIPHASE-CODE AND APPLICATION OF THE METHOD

[75] Inventor: Vratislav Masek, Würenlos, Switzerland

[73] Assignee: BBC Brown Boveri & Company Limited, Baden, Switzerland

[21] Appl. No.: 576,466

[22] Filed: Feb. 2, 1984

Related U.S. Application Data

[63] Continuation of Ser. No. 350,810, Feb. 22, 1982.

[30] Foreign Application Priority Data

Feb. 27, 1981 [CH] Switzerland ........................... 327/81

[51] Int. Cl.$^3$ .............................................. G11B 5/09
[52] U.S. Cl. ......................................... 375/87; 360/42
[58] Field of Search .............. 360/42, 39, 40; 375/87, 375/110, 55; 455/608

[56] References Cited

U.S. PATENT DOCUMENTS

| | | | |
|---|---|---|---|
| 3,727,202 | 4/1973 | Fort | 360/42 |
| 3,831,193 | 8/1974 | McSweeney et al. | 360/42 |
| 3,940,790 | 2/1976 | Conroy et al. | 360/39 |
| 3,947,876 | 3/1976 | Gray | 360/40 |
| 3,949,394 | 4/1976 | Kennedy | 360/42 X |
| 3,979,746 | 9/1976 | Jarrett | 360/42 X |

Primary Examiner—Robert L. Griffin
Assistant Examiner—Albert W. Watkins
Attorney, Agent, or Firm—Werner W. Kleeman

[57] ABSTRACT

In a method for decoding a received biphase-coded signal, a signal edge (2) is detected and its polarity determined in intervals of two periods (2T) for reconstructing the transmitted data. This allows the transmission rate of the signals to be increased up to the maximum frequency limit of the logic family used. By this means data sets (B1–BN), for example in biphase-level code, can be transmitted with start characters (A) optimized for minimum time loss. A decoder can be implemented with very simple monostable multivibrators and a small number of gates. Since sampling controlled by means of a digital counter is not required, the transmission rate can be increased by a factor of 8 to 32.

3 Claims, 10 Drawing Figures

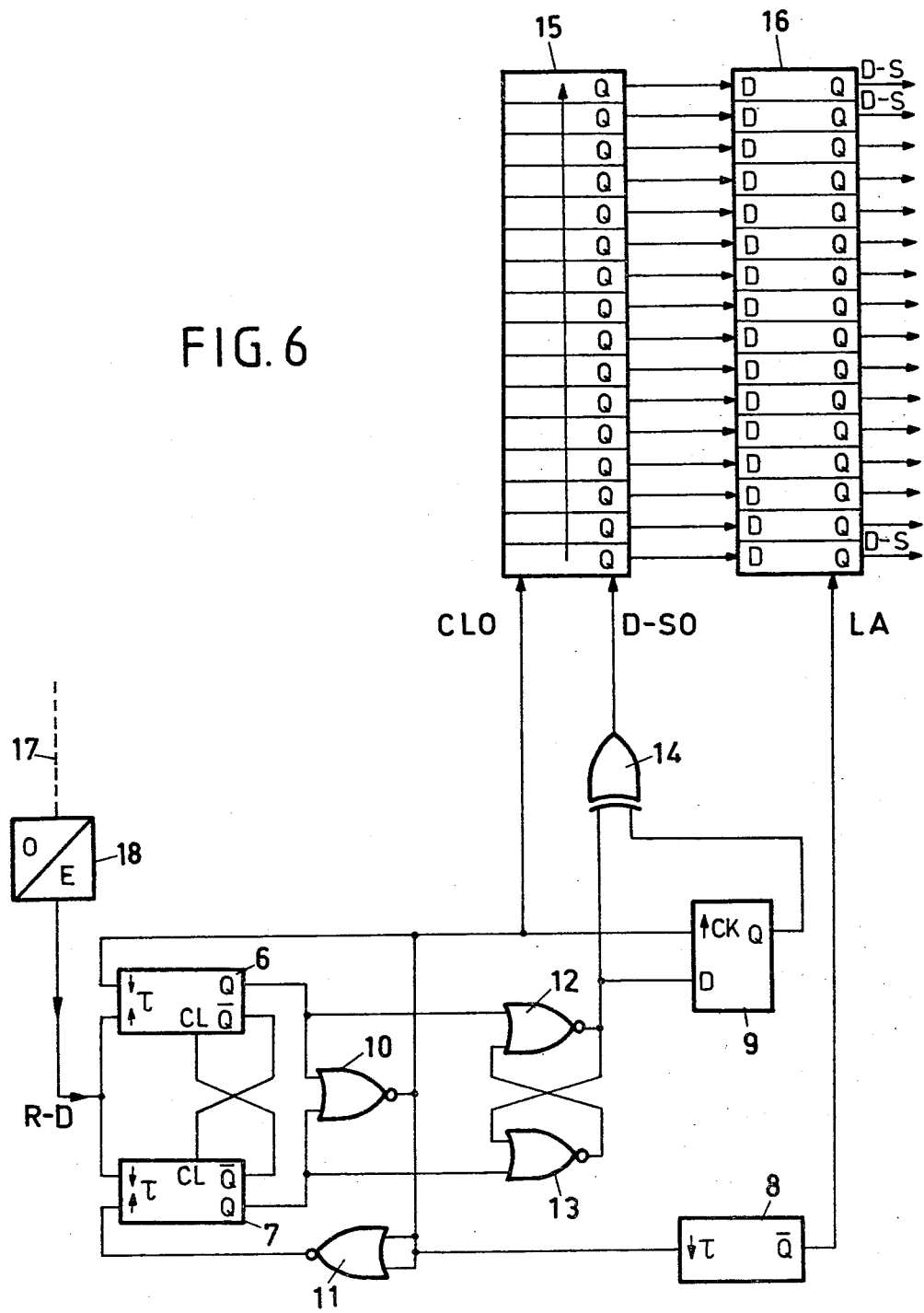

METHOD AND FACILITY FOR DECODING A BIPHASE-CODE AND APPLICATION OF THE METHOD

CROSS-REFERENCE TO RELATED APPLICATION

This application is a continuation of copending United States Application Ser. No. 06/350,810, filed Feb. 22, 1982, entitled "A Method and Facility for Decoding a Biphase-Code and Application of the Method".

BACKGROUND OF THE INVENTION

The present invention relates to a method for decoding a received biphase-coded signal, the data recovered being selected in a logic circuit and then being fed to a shift register, and to a facility or apparatus for carrying out this method and to the application of the method.

For the transmission of data, biphase line codes (also called frequency shift keying or phase shift keying) are used such as biphase-level, biphase-mark, biphase-space and others (see Linear Interface Data Book, Fairchild Camera and Instr. Corp., California, U.S.A., 1978, p. 10-42, FIG. 4-21), the line signals of which have a specified mean value and good clock transmmission characteristics.

Decoding facilities are known (John E. McNamara, Technical Aspects of Data Communication, 1977, by Digital Equipment Corporation, U.S.A., p. 5, FIG. 1-3) which are based on sampling the received signal within each data bit period.

In synchronous data transmission (uninterrupted data stream without bit synchronization characters), the clock for the sampling is obtained from the received signal.

In asynchronous data transmission, the sampling times for the n bits between start and stop character are located at precisely defined intervals away from the first edge of a start character. These intervals are determined by a digital counter which is started by the start character. In this arrangement, the counting rate is 16 times higher than the clock frequency of the data transmission in order to guarantee reliable sampling.

Such methods have the basic disadvantage that the frequency limit is 8-32 times lower than would be permitted by the semiconductor technology used in each case. The reason for this is found in the digital counters used which run 8-32 times faster. In addition, the number of bits between the start and stop character is normally limited to 8-16 bits. This is due to the fact that the determination of the sampling times becomes increasingly inaccurate with an increasing number of bits transmitted since in practice the counting rate is not an exact multiple of the clock frequency.

SUMMARY OF THE INVENTION

For this reason, it is the object of the invention to create a method and a facility which permit the data transmission rate to be increased and allow for a higher number of bits between start and stop character.

The method according to the invention for decoding is characterized in that a signal edge is detected and its polarity determined in intervals of two periods each.

The decoding method can be applied to all bivalent codes in which the polarity of those signal edges which occur at constant intervals is the carrier of the information to be transmitted. The method is of particular advantage for serial data transmission.

The polarity of the periodic signal edge (positive-going or negative-going edge) varies in accordance with the data transmitted (data transmission rate=$\frac{1}{2}T$) so that the following allocation can be established for the biphase-level code: for example, a positive-going periodic edge means a logical zero, a negative-going periodic edge means a logical one.

The following allocation applies to the biphase-mark code: no change in polarity of the periodic edge with respect to the preceding periodic edge means a logical one, a change in polarity means a logical zero. The biphase-space code is the inverse of the biphase-mark code, that is to say no change in polarity means a logical zero, a change means a logical one.

According to the apparatus aspects of the present invention and as employed for carrying out the method, the signal edges of the received signal are detected by at least one non-retriggerable timing element which triggers on both of their polarities, and the length of which is greater than one period and smaller than two periods. This construction of decoder has the advantage that is is particularly simple in design.

The decoding method can be accomplished with the biphase-coding being a biphase-level code, wherein a logical zero is allocated to a positive-going signal edge occurring in intervals of two periods and a logical one is allocated to a negative-going signal edge. Again, with the biphase-coding being a biphase-level code, it is possible for a logical one to be allocated to a positive-going signal edge occurring in intervals of two periods and a logical zero to be allocated to a negative-going signal edge. This biphase-level code is decoded in a form which is the inverse of that previously discussed.

Additionally, the biphase-coding can be a biphase-mark code, wherein a logical one is allocated to no change in the polarity of the signal edge occurring in intervals of two periods with respect to the signal edge preceding it and a logical zero is allocated to a change in polarity.

Also, the biphase-coding can be a biphase-space code, wherein a logical zero is allocated to no change in the polarity of the signal edge occurring in intervals of two periods with respect to the signal edge preceding it and a logical one is allocated to a change in polarity.

According to the invention, the decoding apparatus can be constructed such that there are provided two non-retriggerable timing elements which are operatively connected with one another. One timing element triggers, in each case, in the presence of a positive polarity of the signal edges and the other timing element triggers, in each case, in the presence of a negative polarity of the signal edges. This arrangement allows a maximum achievable data transmission rate of approximately half the maximum working frequency of the semiconductor circuits used for implementation of the decoder, since the highest frequency in the decoder is the clock frequency of the data transmission. In addition, a start character can be followed by any number of data bits since, due to the periodic synchronization of the decoder at every periodic edge, any danger of false sampling due to accumulated time errors is eliminated.

In addition, the decoder construction as just described allows simple detection of the polarity of the signal edge by virtue of the fact that this edge is associated with the timing element triggered in each case.

Moreover, the apparatus can be devised such that for determination of the polarity of the respective signal edge, the received signal is fed to an instantaneous-value store which is controlled by the timing element which triggers on both polarities. This arrangement allows for determining the polarity of the particular signal edges.

The timing element advantageously may be a monostable multivibrator which allows the use of commercially available cost-effective components.

A digital store may be provided which follows the timing element and which stores the information of the polarity of the signal edge. Such an arrangement is suitable particularly in connection with a subsequent series/parallel converter.

The invention further contemplates an arrangement wherein for the asynchronous data transmission including detection of the end of each data set, the timing element is followed by a retriggerable timing element, the pulse length of which is greater than two periods and smaller than the shortest distance in time between two successive data sets of the received signal, triggering and retriggering being accomplished by each signal edge and the end of each data set is detected by a reset signal at the output of the timing element. Such apparatus construction has additional advantageous supplementary circuits for monitoring the data sequence, the transmission path and the plausibility check.

Implementation of this monitoring task is most suitably carried out by constructing the timing element as a monostable multivibrator.

The invention further contemplates the provision of a circuit for reconstructing the original data in a parallel data sequence, wherein the data signal is supplied to a shift register of the serial-in/parallel-out type. Also, there may be provided a circuit for reconstructing the original data in a parallel data sequence, wherein the timing element is followed by a circuit arrangement which consists of a further store and a logic circuit. In this arrangement the polarities of the nth signal edge are compared with the (n-1)th signal edge. Such circuitry constitute advantageous solutions in connection with a series/parallel conversion for data reconstruction.

The method can be employed with a fiber-optical transmission path. This is particularly suitable for serial remote transmission.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3b shows the sampling pulses for the sets of data of FIG. 3a;

FIG. 6 shows another variant of a decoder for 16-bit data sets in a biphase-mark code.

DETAILED DESCRIPTION OF THE PREFERRED EMBODIMENTS

Figure 1A:
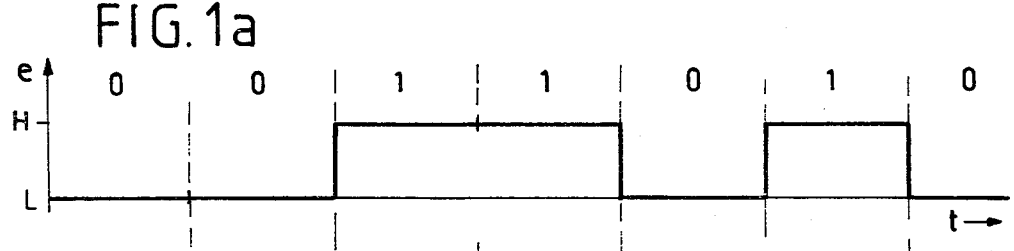
FIG. 1a shows an example of a timing diagram of digital data to be transmitted.

A timing diagram in FIG. 1a, shows a familiar representation of data to be transmitted. The signal voltage is here designated by e, the signal levels by H and L and the time axis by t.

Figure 1B:
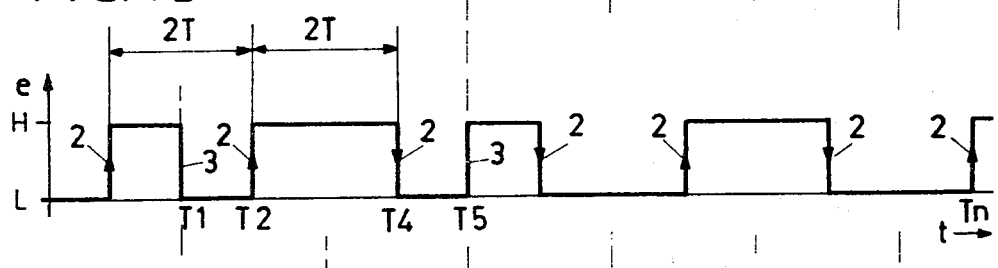
FIG. 1b shows the data of FIG. 1a converted into the biphase-level code which is known in itself.
Figure 1C:
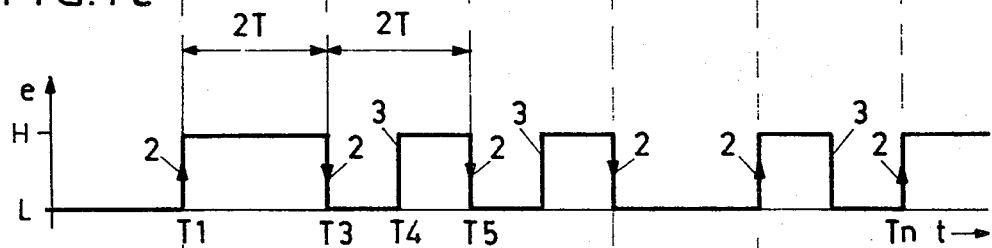
FIG. 1c shows the data of FIG. 1a converted into the biphase-mark code which is known in itself.
Figure 1D:
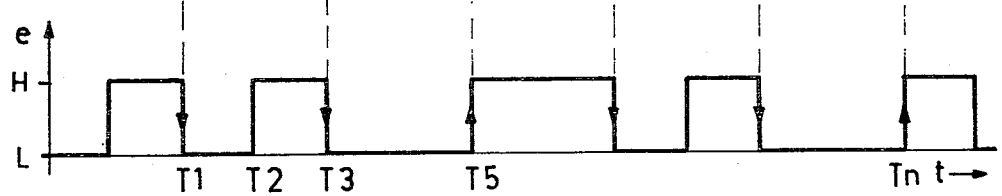
FIG. 1d shows the data of FIG. 1a converted into the biphase-space code which is also known.

The data of FIG. 1a are represented in FIG. 1b in a biphase-level code, in FIG. 1c in a biphase-mark code and in FIG. 1d in a biphase-space code.

The periods are designated by T1 ... Tn in FIGS. 1b to 1d.

As can be seen from FIG. 1b and FIG. 1c, the biphase codes have a periodicity of 2T. In the intervals of 2T a signal edge 2, a so-called periodic edge, can always be observed. This 2T periodicity only exists in the presence of this edge which does not provide its polarity. This polarity, positive-going or negative-going edge, varies in accordance with the data to be transmitted (data transmission rate $=\frac{1}{2}T$) so that an association can be established. For example, a positive-going periodic edge 2 in FIG. 1b means a logical zero $=0$ and a negative-going periodic edge characterizes a logical One $=1$. The remaining signal edges 3 occur aperiodically; they only occur when the polarity of the periodic edges does not change in the sequence of the instantaneous data bit combination.

It can be seen from this relationship that the original data sequence can be reconstructed on the basis of the polarity of the periodic edges in a received signal in the case of a biphase code.

Figure 2:
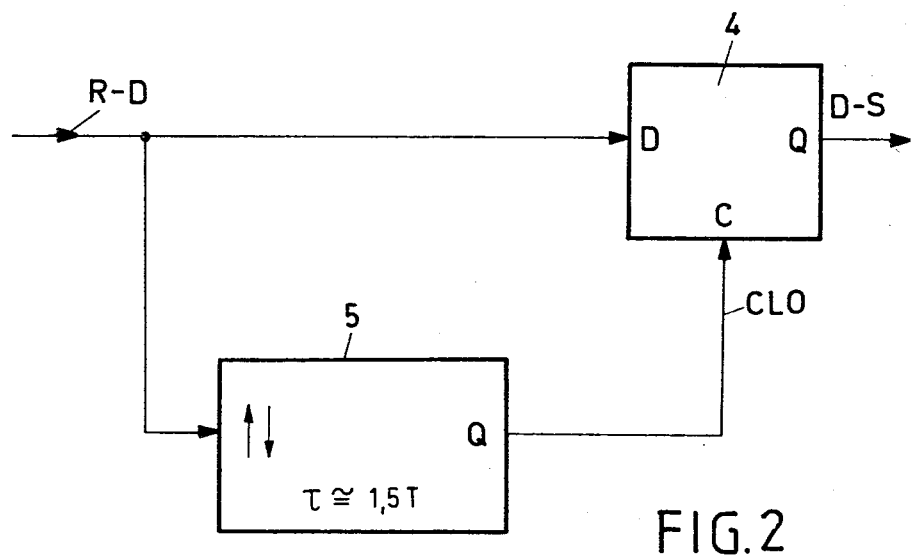
FIG. 2 shows a block diagram of a simple decoding facility.

In practice, the polarity of the edge 2 is detected by sampling a received signal before or after each periodic edge. For this purpose a simple economic decoder in accordance with FIG. 2 is sufficient.

The received signal R-D (Received Data) is for this purpose supplied to an input of a non-retriggerable monostale multivibrator 5 and to the D input of a flip flop 4 (D-type). The output Q of the multivibrator 5 supplies a clock signal CLO which is fed to a clock input C of the flip flop 4. At the output Q of the flip flop 4 the sampled data signals D-S can be obtained.

The operation of this facility is as follows:

The monostable multivibrator 5 triggers on both polarities of the signal edges of the received biphase signal R-D (Received Data). The length of the pulse generated (=pulse length) is between T and 2T and is preferably 1.5T. Since these signal edges can only occur at intervals of 1T or 2T, the shortest possible trigger sequence is 2T. As soon as the monostable multivibrator 5 has triggered once on the periodic edge, it will continue to be able to trigger only on the periodic edges, because only these always occur after the end of the pulse when the monostable multivibrator can be triggered again (stable state of the decoder). The 1.5T pulse generated by the monostable multivibrator occurs immediately after each periodic edge and can be used directly as a clock for sampling the received signal (for example, its first or second edge or a strobe pulse derived from these edges). For storing the sampled data a D-type flip flop (flip flop 4) is used, which in itself is commercially available.

In the case of undefined starting conditions, interruptions or errors in the transmission path it can occur that the monostable multivibrator starts to trigger on the aperiodic edges. This phase-shifted running of the decoder, however, is unstable, that is to say it lasts ony until the aperiodic edge is missing for the first time, after which the decoder synchronizes itself by "waiting" for the next edge which must be periodic. In all biphase codes, this is the case at the first change in the transmitted data from logical zero to logical one or from logical one to logical zero.

The decoder can be used for synchronous and asynchronous data transmissions.

In the case of synchronous data transmissions, the decoder offers the advantage of an extremely short locking time for the synchronization. If the decoder is supplemented by a circuit for monitoring the trigger sequence (triggering must take place every 2T), it is possible to detect errors immediately in the transmission path (periodic edge missing).

In the case of asynchronous data transmission, the decoder requires no locking time for synchronization if the start character contains an edge which is periodic with respect to subsequent data bits (first edge of any polarity after a pause which is greater than 2T).

Figure 3A:
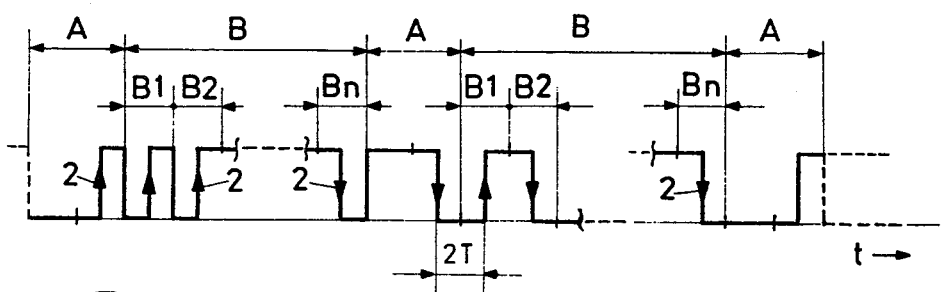
FIG. 3a shows, by way of example, sets of data in biphase-level code containing a start character which is optimized for minimum time loss.

FIG. 3a shows data sets B, consisting of B1 ... Bn bits in biphase-level code with a start character A which is in each case optimized for minimum time loss and which permits the decoder to be synchronized at each start and at the same time allows the end of the respective data set B to be detected (with the aid of an additional feature represented in FIG. 4). So that the constant mean value of the code is not changed by the additon of the start character A, the polarity of the start characters A following each other can be alternated as is indicated in FIG. 3a.

Figure 3B:
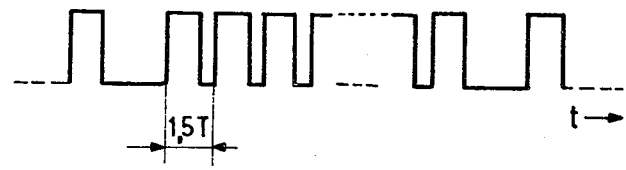

The timing diagram in FIG. 3b shows the sampling pulses for detecting the data sets in FIG. 3a, again with pulse length $\tau = 1.5T$.

Figure 4:
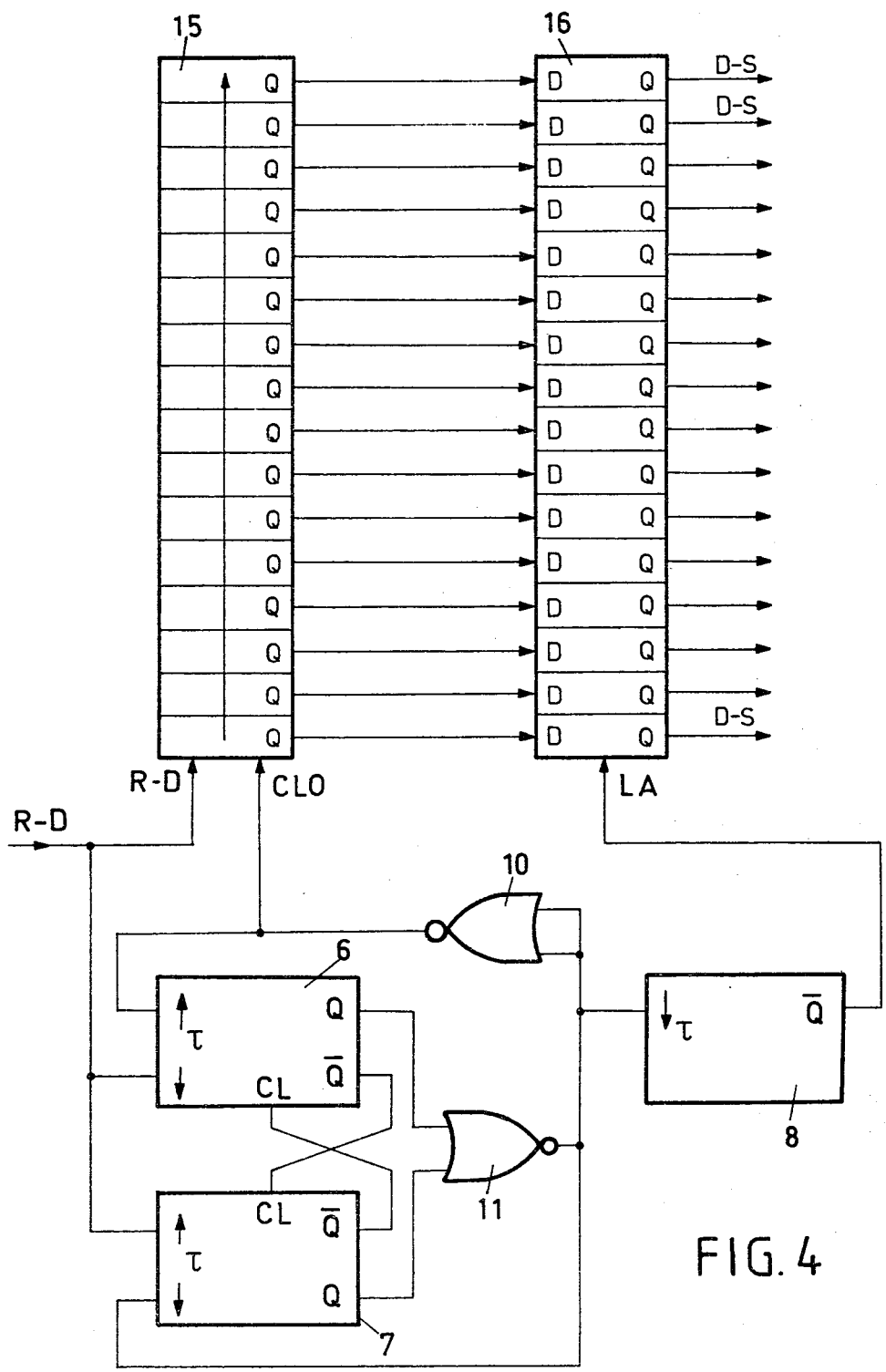
FIG. 4 shows a decoder for an asynchronous 16-bit data transmission including a shift register followed by a data store.

A decoder, shown in FIG. 4, is used for asynchronous data transmission with 16-bit data sets in biphase-level coding.

The received signal R-D is here fed to the first inputs of two monostable multivibrators 6 and 7 with mutual feedback via the clear inputs CL. The Q outputs of the multivibrators 6 are combined via a gate 11 (NOR gate). Its output Q is fed back directly to the second input of the multivibrator 7, whereas the feedback path to the second input of the multivibrator 6 includes an inverter, a gate 10.

This combination is considered to be a variant of a non-retriggerable timing element 5 which responds to both polarities of the signal edges and can be easily implemented by means of a dual monostable multivibrator (for example Fairchild Type F 96 S02). The output of the gate 10 supplies a clock signal CLO which clocks the shift register 15. The received signal R-D is applied to the signal input of the shift register 15. In addition, the output of the gate 11 is fed to one of the trigger inputs of a multivibrator 8. The output of the multivibrator 8 is fed to a control input LA (Latch) of a 16-bit store 16. The data signals D-S can be obtained in parallel at the Q outputs of the store 16.

This circuit arrangement is again assembled from commercially available components.

The other monostable multivibrator 8 is set for a pulse length of $\tau$ of 2.5T. It monitors the trigger sequence by being triggered every 2T at the clock rate of the clock signal CLO for the sampling circuit. If the periodic edge is missing, and thus the clock for sampling, at the end of the data set, it generates a command LA for storing the data set read into the shift register in the 16-bit store 16. This detection of the end of the data set, which is an additional feature with respect to the circuit arrangement of FIG. 2, can be combined with a monitoring feature, known in itself, of the length of the data set in order to be able to differentiate between the lack of the periodic edge due to an error in the transmission path and the real end of the data set.

Another possibility of monitoring transmission errors or the plausibility of the data coding, respectively, consists in sampling each data bit twice, that is with the positive-going and the negative-going edge of the pulse generated by the monostable multivibrator 8 (or of the strobe pulses derived from this pulse).

In the facility shown in FIG. 4, having two multivibrators 6 and 7, which have mutual feedback and which trigger on both polarities of the signal edges, direct sampling of the received signal R-D can be omitted; the periodic edges are continuously identified by the two multivibrators due to the fact that one of them triggers on the positive-going and the other on the negative-going periodic edge.

Figure 5:
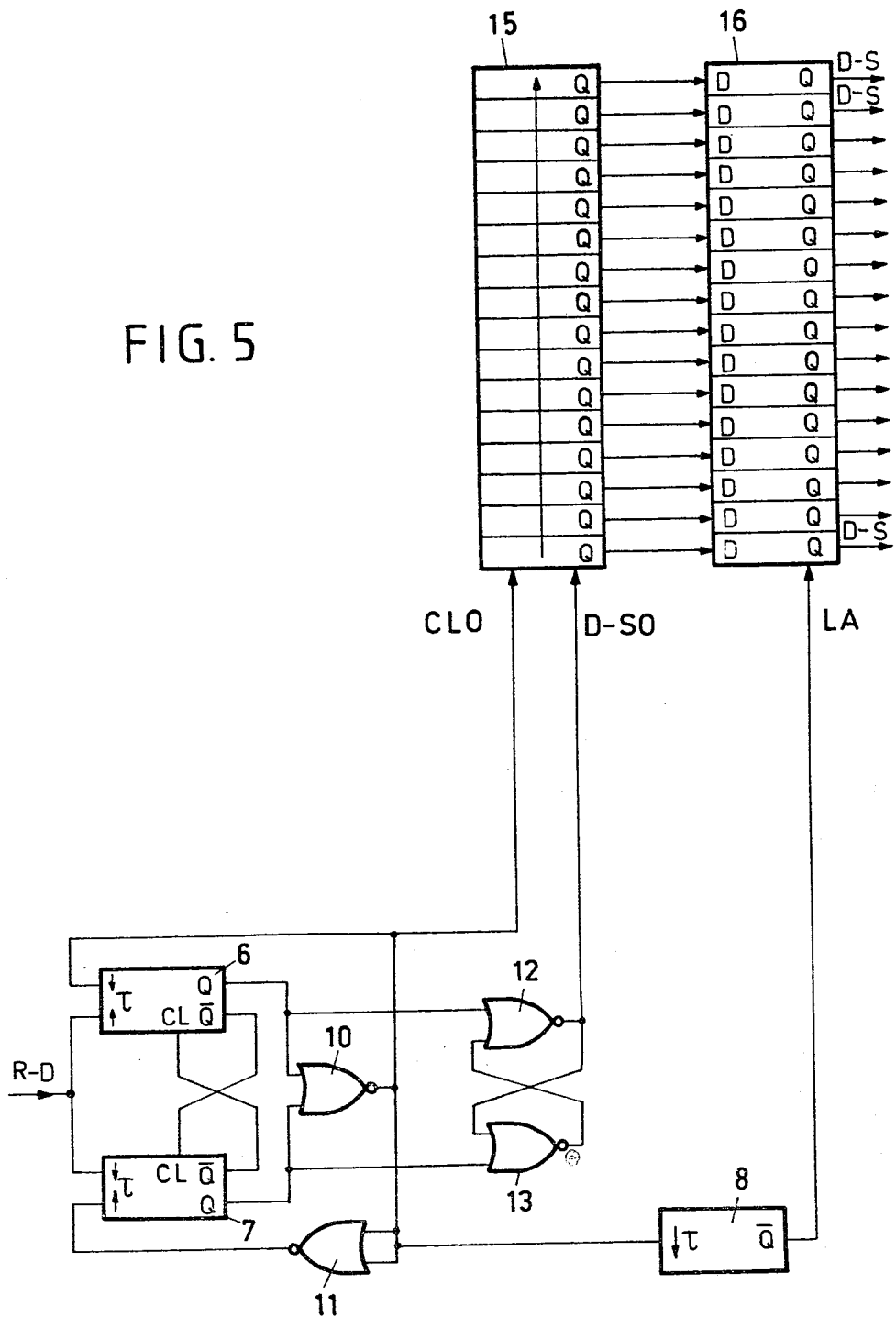
FIG. 5 shows a variant of a decoder followed by shift registers.

Such a variant is shown in FIG. 5 in which the decoder processes 16-bit data sets in biphase-level code on the principle of direct identification of the polarity of the edge. For this purpose, the facility in FIG. 4 is supplemented by a so-called set-reset store, formed in the familiar way from the gates 12 and 13 (NOR gate). At the output of the gate 12, a serial data signal D-SO appears which is fed to the data input of the shift register 15 as the first stage of a conversion into the parallel data signal 16. The control input of the shift register 15 is supplied with the clock signals CLO which are generated as in the embodiment of FIG. 4.

The variant of FIG. 6 is used for decoding 16-bit data sets in biphase-space code. For this purpose, the circuit arrangement shown in FIG. 5 is supplemented by an additional logic circuit which compares the polarity of the last with the last-but-one periodic signal edge. By this means the data sequence transmitted is reconstructed.

This is implemented by means of an additional flip flop 9, again a D-type flip flop, which stores the information of the penultimate polarity and is followed by a gate 14, an EX-OR gate which compares the two polarities.

The decoder, described in FIG. 6, for a 16-bit data set in biphase-space code can be converted in the simplest way into a decoder for a biphase-mark code. Since the biphase-mark code is the inverse of the biphase-space code, it is sufficient to implement the gate 14 shown in FIG. 6 as an EX-NOR gate instead of an EX-OR gate.

In the embodiment of FIG. 6 the received signal R-D is supplied by an opto-electric converter 18. This converter receives its input signals from a fiber-optic transmission path 17.

The illustrative circuit arrangement shown can, of course, be implemented in numerous variants by means of other logic components with equivalent functions.

The decoders according to the invention are suitable for synchronous data transmissions, asynchronous data transmissions with continuous or intermittent data stream, for data transmissions by means of data multiplex (that is to say, individual data sets combined into a longer data set) and for bus systems with non-synchronized transmitting clock of the data sources.

While there are shown and described present preferred embodiments of the invention, it is to be distinctly understood that the invention is not limited thereto, but may be otherwise variously embodied and practiced within the scope of the following claims. Accordingly,

What I claim is:

1. A device for decoding a biphase-encoded data-signal, comprising:
   a timing element with an impulse length between one and two data-signal periods, a first output of which is set by positive and a second by negative signal edges;
   setting of the first output being inhibited while the second output is set and vice versa;
   a clock extraction circuit connected to the outputs of the timing element extracting a periodic clock signal with a period double the data signal period from the output signals of the timing element; and
   a data extraction circuit comprising a bistable element connected to the outputs of the timing element, said data extraction circuit extracting decoded data from the output signals of the timing element.

2. The device according to claim 1, wherein the timing element comprises:
   a first and second monostable multivibrator with an impulse length between one and two data signal periods each;
   the first monostable multivibrator having at least one output set by positive signal edges for the duration of an impulse length and a clearing input;
   the second monostable multivibrator having at least one output set by negative signal edges for the duration of an impulse length and a clearing input; and
   the clearing input of the first monostable multivibrator being connected to said at least one output of the second monostable mulitvibrator such that setting of said at least one output of the first monostable multivibrator is inhibited while said at least one output of the second monostable multivibrator is set and vice versa.

3. The device according to claim 1, further including:
   a monostable multivibrator with an impulse length greater than two data-signal periods connected to the clock extraction circuit; and
   said monostable multivibrator generating latch signals at the ends of data sets.

* * * * *